United States Patent
Suzuki

(10) Patent No.: US 8,279,346 B2
(45) Date of Patent: Oct. 2, 2012

(54) FRAME RATE CONVERTING APPARATUS AND METHOD THEREOF

(75) Inventor: Masaki Suzuki, Cambridge, MA (US)

(73) Assignee: Canon Kabushiki Kaisha, Tokyo (JP)

( * ) Notice: Subject to any disclaimer, the term of this patent is extended or adjusted under 35 U.S.C. 154(b) by 553 days.

(21) Appl. No.: 12/499,518

(22) Filed: Jul. 8, 2009

(65) Prior Publication Data

US 2010/0020230 A1 Jan. 28, 2010

(30) Foreign Application Priority Data

Jul. 22, 2008 (JP) ................ 2008-189047

(51) Int. Cl.
| | |
|---|---|
| H04N 5/21 | (2006.01) |
| H04N 5/00 | (2011.01) |
| H04N 11/20 | (2006.01) |
| G06K 9/40 | (2006.01) |

(52) U.S. Cl. ........ 348/625; 348/607; 348/441; 382/266; 382/263; 382/264

(58) Field of Classification Search .............. 348/625, 348/620, 607, 447, 446, 441; 382/266, 263, 382/264

See application file for complete search history.

(56) References Cited

U.S. PATENT DOCUMENTS

| | | | | |
|---|---|---|---|---|
| 5,241,387 | A * | 8/1993 | Fujikawa et al. | 348/607 |
| 5,754,246 | A * | 5/1998 | Flannaghan | 348/459 |
| 6,449,013 | B1 | 9/2002 | Suzuki et al. | 348/279 |
| 6,693,676 | B2 * | 2/2004 | Yamaguchi et al. | 348/452 |
| 7,518,636 | B2 | 4/2009 | Endo et al. | 348/208.99 |
| 7,542,619 | B2 | 6/2009 | Toyooka et al. | 382/260 |
| 2003/0107569 | A1 | 6/2003 | Endo et al. | 345/419 |
| 2006/0028541 | A1 * | 2/2006 | Haraguchi | 348/27 |
| 2007/0139321 | A1 | 6/2007 | Takemoto et al. | 345/87 |
| 2007/0139322 | A1 | 6/2007 | Takemoto et al. | 345/87 |
| 2008/0218635 | A1 * | 9/2008 | Tsuruoka | 348/607 |

FOREIGN PATENT DOCUMENTS

JP 2006-184896 7/2006

* cited by examiner

*Primary Examiner* — Hoang-Vu A Nguyen-Ba

(74) *Attorney, Agent, or Firm* — Fitzpatrick, Cella, Harper & Scinto

(57) ABSTRACT

In an image processing apparatus, degradation of edges of stationary subjects can be suppressed in a moving image obtained by converting moving image data having F frames per unit time into moving image data having 2F sub frames per the unit time. For this purpose, pixel data is inputted in order of raster scanning into an input terminal. Then three contiguous pixel data X1 to X3 are obtained by the input terminal and two delay circuits. A differentiator calculates a difference d1 (=X1−X2) between the pixel data of interest X2 and the neighbor pixel data X1 and a difference d2 (=X3−X2) between the pixel data of interest X2 and the neighbor pixel data X3. A multiplier coefficient for low-pass filter calculation is determined based on the differences d1 and d2, and pixel data X2' is calculated as pixel data after filter-processing of the pixel data of interest X2.

6 Claims, 14 Drawing Sheets

FRAME RATE CONVERTING APPARATUS AND METHOD THEREOF

BACKGROUND OF THE INVENTION

1. Field of the Invention

The present invention relates to a technique for converting input moving image data into higher frame-rate moving image data.

2. Description of the Related Art

A CRT has long served as a moving image display device typified by a television receiver. In recent years, however, a thin panel type display device using a liquid crystal device is mainly used. FIG. 10 shows a feature of the liquid crystal device. In FIG. 10, a horizontal axis indicates time, and a vertical axis, pixel brightness. The frame rate in this example is 60 frames/sec. As shown in FIG. 10, in the case of liquid crystal device, light emission is held during a period of 1/60 sec for 1 frame. Accordingly, the liquid crystal device is called a "hold type" device.

The hold type device has a problem that a blur often occurs with respect to a motion. FIG. 11 shows the problem. In FIG. 11, a horizontal axis indicates a position on a screen, and a vertical axis, time. The figure shows an example where a rectangular waveform moves rightward from a left side on the screen. When this motion is visually checked, a status where pixels stay in the same positions for 1/60 sec causes a relative delay with respect to the motion. When the hold time is long, the width of the delay is prolonged, and it is visually perceived as a moving blurring on the screen. The bottom part of FIG. 11 shows a view upon pursuit, in which a blur with a certain width is detected on an edge.

As an example of a moving blurring countermeasure, the hold time is shortened by raising a driving frequency. FIG. 12 shows an example of display at a doubled frequency, 120 Hz.

Further, to obtain a doubled frame rate, a method of dividing an input image into an image including high frequency components and an image including only low frequency components and producing a display in a time direction is known. FIG. 13 shows a dynamic characteristic of a drive-distributed image by this method. As it is understood from a comparison with FIG. 11, the moving blurring is greatly reduced.

Further, as a device having a similar light emission characteristic to that of a CRT, a field emission type display device is developed. FIG. 14 shows the light emission characteristic of such a device. As in the case of FIG. 10, a horizontal axis indicates time, and a vertical axis, pixel brightness. This type of display device, in which light emission is made only for a very short period of time within the 1/60 sec period, is called an "impulse type" device.

The impulse type device, which repeats execution/non-execution of light emission in a cycle of 1/60 sec, has a disadvantage that this turning on and off is frequently perceived as flicker. As the flicker becomes conspicuous with the display area, in the recent trend for large screen display device, the above disadvantage may cause a serious problem.

FIG. 15 shows a dynamic characteristic of the impulse type device. As the most important feature of the impulse type device, different from the characteristic of the hold type device, a moving blurring which may become an afterimage does not occur.

As an example of flicker countermeasure, the driving frequency may also be raised. FIG. 16 shows an example of display at a doubled frequency, 120 Hz. In the case of the impulse type device, a display, the brightness level of which is the half of brightness for 1 display, is produced twice, and thereby an equivalent brightness is obtained.

FIG. 17 shows a dynamic characteristic in a case where an image including high frequency components and an image including only low frequency components are divisionally displayed in a time direction. When the frames are respectively displayed twice, double vision occurs, however, by displaying only the high frequency side once, visual degradation is suppressed except for a blur due to low frequency components.

As described above, the distribution of a frame image into 2 sub frames in accordance with frequency component is advantageous as a moving blurring countermeasure in the hold type display device and a flicker countermeasure in the impulse type display device.

As an example of implementation of hold-type doubled-speed driving, Japanese Patent Laid-Open No. 2006-184896 is known. FIG. 18 shows a part of circuitry in the document. A low-pass filter processor 1002 generates a sub frame including only low frequency components from an input frame. The sub frame including only low frequency components is temporarily stored in a frame memory 1004. On the other hand, a difference detection unit 1003 subtracts the sub frame including only low frequency components generated by the low-pass filter processor 1002 from the input frame, i.e., it detects a difference, and thereby extracts high frequency components. The generated high frequency components are added to the input frame by an adder, and thereby a sub frame where high frequency components are emphasized is obtained. A selection circuit 1005 selects the low frequency sub frame stored in the frame memory 1004 or the high frequency sub frame in a cycle of 120 Hz and sends the selected sub frame to the next stage processing. By alternately displaying the sub frame without high frequency component and the sub frame where high frequency components are emphasized, an original frame image is reproduced in a view in a cycle of 60 Hz.

However, in some cases, the apparent frame image obtained by combining two sub frames is not the same as the original frame image. Hereinbelow, the problem will be described using FIGS. 19A to 19F.

FIG. 19A shows an example of a waveform of an input frame image. FIG. 19B shows an output waveform obtained by filter processing on the input frame image by the low-pass filter processor 1002 in FIG. 18. FIG. 19C shows an output waveform detected by the difference detection unit 1003 in FIG. 18. As it includes high frequency components, it has positive and negative values. FIG. 19D shows a waveform obtained by adding the high frequency components (FIG. 19C) to the original input waveform (FIG. 19A). In theory, by alternately displaying the waveform in FIG. 19C and the waveform in FIG. 19D in a cycle of 120 Hz, an apparent waveform is the same as the waveform in FIG. 19E. However, when the value of the low brightness level part in FIG. 19A is "0" or a value close to "0", a part of the waveform in FIG. 19D has a negative value. Since it is impossible to display a negative value image, actually the negative value is displayed as "0" in the waveform in FIG. 19E different from that in FIG. 19D. In this case, as the waveform in FIG. 19B and the waveform in FIG. 19E are alternately displayed as an apparent composite waveform, a waveform as shown in FIG. 19F is perceived by the human eye. The waveform in FIG. 19F means that when white characters are displayed on black background (such as captions), the image is perceived as an image where the outlines of characters are blurred. In this manner, in accordance with waveform of input image, a distribution-processed image does not look alike an original image and is perceived as degradation.

SUMMARY OF THE INVENTION

The present invention has been made in view of the above problems. Further, the present invention provides a technique for suppressing degradation of edges of stationary subjects in a moving image even when the frame rate is converted to a higher frame rate.

According to an aspect of the present invention, provided is an image processing apparatus for converting moving image data having F frames per unit time into moving image data having 2F sub frames per the unit time, comprising: an input unit to input moving image data by frame; a low-pass filter to multiply pixel data of interest and neighbor pixel data of the pixel data of interest in the frame inputted by the input unit by a multiplier coefficient and add up the results of multiplication, thereby generate a low-frequency sub frame; a high-frequency sub frame generator to extract high frequency component data from the frame inputted by the input unit and add the high frequency component data to the frame inputted by the input unit, and thereby generate a high-frequency sub frame; and an output unit to output the low-frequency sub frame and the high-frequency sub frame, wherein the low-pass filter comprises: a subtracter to subtract a brightness value of the pixel data of interest from a brightness value of the neighbor pixel data; a comparator to compare a result d1 of subtraction by the subtracter with a previously-set threshold Th equal to or greater than 0; and a selector to, when $d1 \leq Th$ holds as the result of comparison by the comparator, select a previously-set positive multiplier coefficient V0 as a multiplier coefficient for multiplication of the neighbor pixel data, while when $d1 > Th$ holds as the result of comparison by the comparator, select a positive multiplier coefficient V1 less than the multiplier coefficient V0 as the multiplier coefficient for multiplication of the neighbor pixel data.

According to the present invention, it is possible to suppress degradation of edges of stationary subjects in a moving image obtained by converting moving image data having F frames per unit time into moving image data having 2F sub frames per unit time.

Further features of the present invention will become apparent from the following description of exemplary embodiments with reference to the attached drawings.

DESCRIPTION OF THE EMBODIMENTS

Hereinbelow, preferred embodiments of the present invention will now be described in detail in accordance with the accompanying drawings.

[First Embodiment]

As a first embodiment, an example particularly appropriately applicable to a hold type display device will be described.

Figure 1:
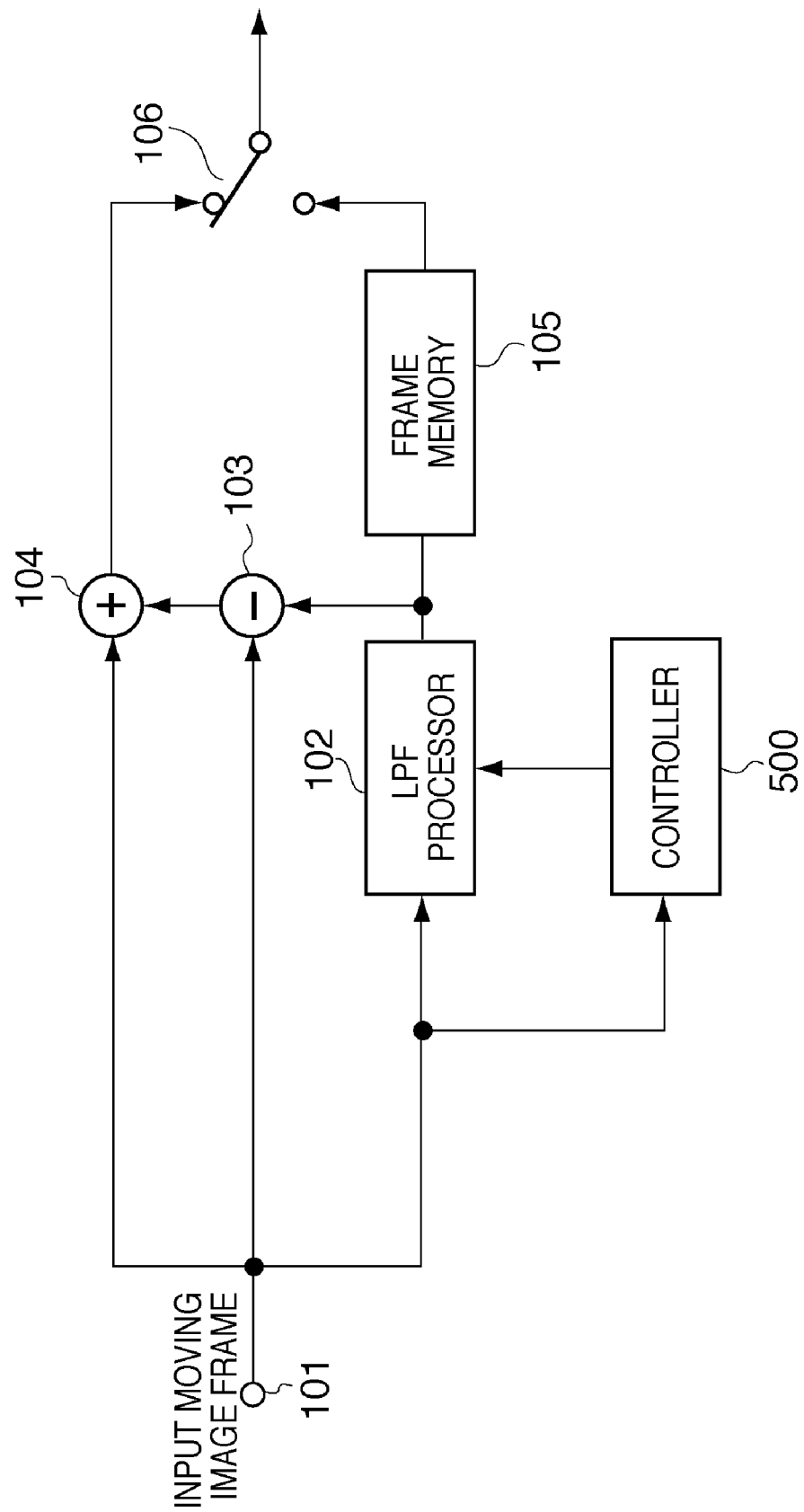
FIG. 1 is a block diagram of an image processing apparatus according to a first embodiment of the present invention.

FIG. 1 is a block diagram of an image processing apparatus according to the first embodiment of the present invention. The image processing apparatus has a controller 500 to control the entire apparatus, an input terminal 101, a low-pass filter (LPF) processor 102, a subtracter 103, an adder 104, a frame memory 105 and a selection circuit 106. Note that buffer memories for timing control exist among the respective processors, however, they are omitted in the figure.

In the image processing apparatus, a moving image with a frame rate of F/sec is converted to a moving image with a doubled frame rate of 2F/sec. Note that F/sec is, e.g., 60 frames/sec. Accordingly, for 1 frame image, 2 sub frames are generated and outputted for every input. One of the 2 sub frames includes high frequency components. Hereinbelow, this sub frame will be referred to as a "high frequency sub frame". The other one of the 2 sub frames, which includes only low frequency components, will be referred to as a "low frequency sub frame".

Note that as a moving image input source, a video camera is used. However, the moving image data may be decode-processed data obtained from a DVD media. Further, any type of moving image data can be handled.

Further, in the present embodiment, for the sake of simplification of explanation, the moving image data is monochrome (an image having only brightness components) data. Further, 1 pixel is represented with 8 bits (256 tone levels). Note that in the case of a color moving image having, e.g., R, G and B components, as the following processing is performed for the respective color components, the moving image data is not necessarily monochrome data.

First, low-frequency sub frame generation processing will be described.

The LPF processor 102 inputs 1 frame image data inputted from the input terminal 101, and performs filter processing to remove high frequency components. The function of the filter processing may be a Gaussian function, a moving average filter or a weighted moving average filter. Note that as in the following description, the controller 500 sets respective values (parameters) upon filtering processing.

Figure 7:
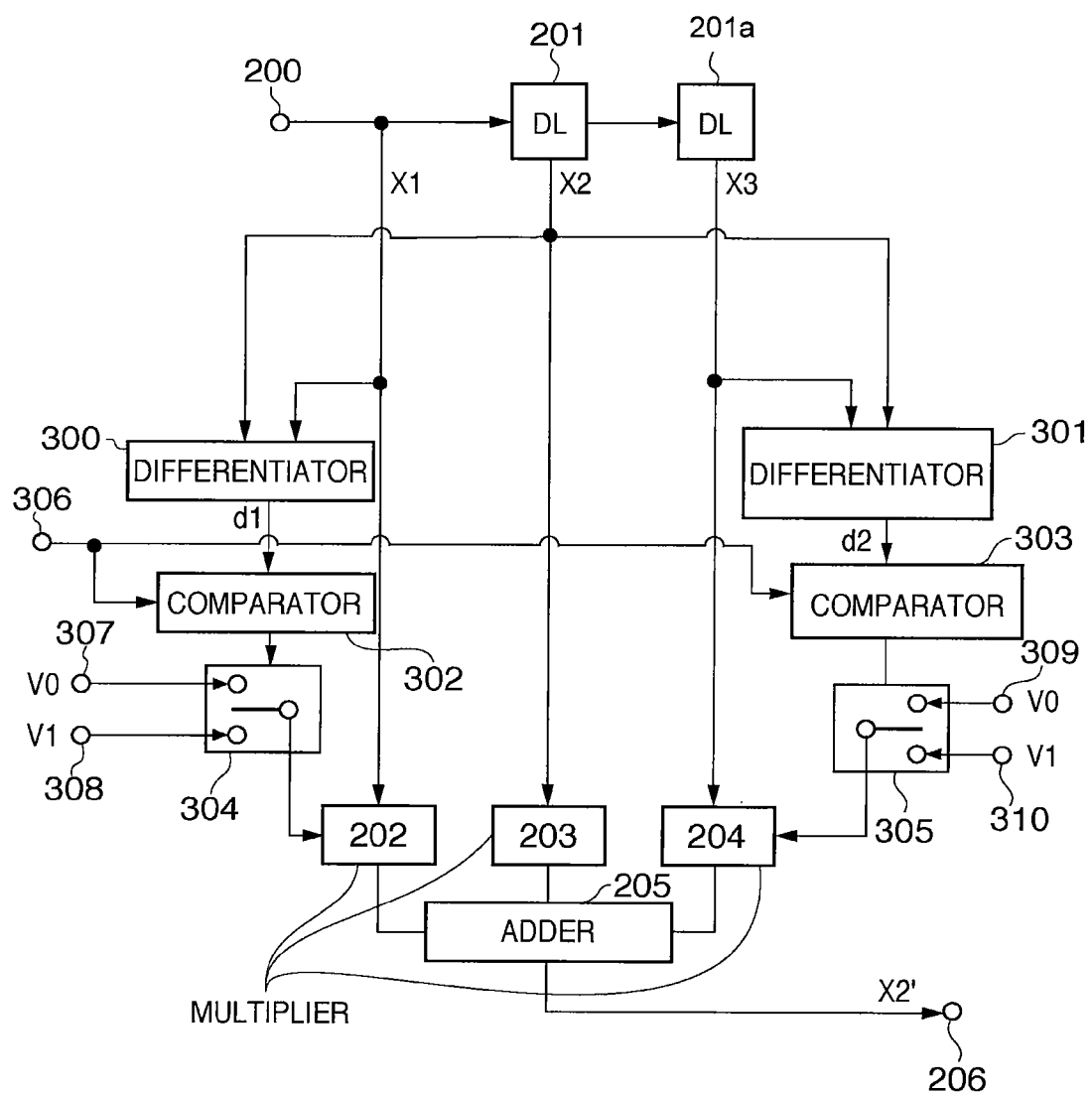
FIG. 7 is a block diagram of a low-pass filter processor in the first and second embodiments.

FIG. 7 shows a particular configuration of the LPF processor 102 in the first embodiment.

In the LPF processor 102, pixel data in 1 frame as described above is supplied to an input terminal 200 in order of raster scanning.

Delay circuits (DLs) 201 and 201a respectively perform delay processing for 1 pixel. In this example, pixel data supplied to the input terminal 200 is X1, pixel data stored in the delay circuit 201, X2, and pixel data stored in the delay circuit 202, X3. Note that in the following description, the values of the pixel data X1, X2 and X3 will be referred to as brightness values X1, X2 and X3. In the present embodiment, the subject of the filtering processing is the pixel data X2. Hereinbelow, the pixel data X2 will also be referred to as a "pixel data of interest".

As the pixel data X1 is positioned behind the pixel data of interest X2 by one pixel, the pixel data X1 is a right-hand neighbor pixel of the pixel data of interest X2 on the screen. Further, as the pixel data X3 is a left-hand neighbor pixel of the pixel data of interest X2 on the screen. The LPF processor 102 performs filter processing based on these three contiguous pixel data. That is, the LPF processor 102 in the present embodiment performs the filter processing by referring to pixels for horizontal 3 taps.

Multipliers 202 to 204 multiply the brightness values X1, X2 and X3 by the following multiplier coefficients. Then an adder 205 adds up the respective results of multiplication, and outputs pixel data X2' as the result of low-pass filter processing with respect to the pixel data of interest X2.

A differentiator 300 subtracts the pixel data of interest X2 from the neighbor pixel data X1, and outputs a subtraction result d1.

$$d1=X1-X2$$

Then the differentiator 300 outputs the subtraction result d1 as a difference to a comparator 302. Note that the value of the difference d1 may be any of positive and negative values.

The comparator 302 compares a threshold Th set at a terminal 306 by the controller 500 with the difference d1, and outputs the result of comparison to a selection circuit 304. The threshold Th is set by the controller 500 in accordance with an input from an operation unit (not shown), and the threshold Th has a value equal to or greater than "0".

For the sake of simplification of explanation, in this embodiment, Th=0 holds as the threshold. The comparator 302 determines whether or not the brightness of the pixel data of interest X2 is lower than that of the neighbor pixel data X1. Particularly, when the threshold Th is higher, it is determined that the brightness of the pixel data of interest X2 is sufficiently low with respect to the neighbor pixel data X1.

In the present embodiment, when d1>Th holds (when the brightness of the pixel data of interest X2 is lower than that of the neighbor pixel data X1), the comparator 302 outputs a signal "1" to the selection circuit 304. On the other hand, when d1≦Th holds, the comparator 302 outputs a signal "0" to the selection circuit 304.

In the selection circuit 304, multiplier coefficients V0 and V1 (both positive values) for filter processing are previously set by the controller 500 at terminals 307 and 308. The multiplier coefficient V0 is a sufficient value to remove general high frequency components. On the other hand, the multiplier coefficient V1 is a lesser value than the multiplier coefficient V0. The multiplier coefficient V0 may be a fixed value, however, the multiplier coefficient V1 is set by the controller 500 in accordance with a user's instruction within a range of 0≦V1<V0.

When the signal from the comparator 302 is "0", the selection circuit 304 selects the multiplier coefficient V0 and outputs the selected coefficient V0 to the multiplier 202. When the signal from the comparator 302 is "1", the selection circuit 304 selects the multiplier coefficient V1 less than the multiplier coefficient V0 and outputs the selected coefficient V1 to the multiplier 202.

The multiplier 202 multiplies the neighbor pixel data X1 inputted subsequently to the pixel data of interest X2 by the multiplier coefficient (V0 or V1) supplied from the selection circuit 304.

The above processing will be briefly described as follows.

When the pixel data of interest X2 is positioned in a dark area outside an edge of a white character by 1 pixel and the neighbor pixel data X1 exists on the edge of the white character, the selection circuit 304 selects the less multiplier coefficient V1, otherwise, the selection circuit 304 selects the multiplier coefficient V0.

The above selection is similarly performed in the cases of the differentiator 301, the comparator 303, a selector circuit 305 and a multiplier 204. That is, the differentiator 301 calculates a difference d2 between the pixel data of interest X2 and the neighbor pixel data X3:

$$d2=X3-X2,$$

and outputs the calculated difference d2 to the comparator 303.

The comparator 303 compares the difference d2 with the threshold Th, and outputs the result of comparison to the selection circuit 305. As in the case of the selection circuit 304, the selection circuit 305 selects one of the multiplier coefficients V0 and V1 set at terminals 309 and 310 by the controller 500, based on the result of comparison by the comparator 303, and outputs the selected coefficient to the multiplier 204. More particularly, when d2≦Th holds, the selection circuit 305 selects the multiplier coefficient V0, while when d2>Th holds, the selection circuit 305 selects the multiplier coefficient V1.

The multiplier 204 multiplies the neighbor pixel data X3 inputted prior to the pixel data of interest X2 by the multiplier coefficient (V0 or V1) supplied from the selection circuit 305.

The multiplier 203 multiplies the pixel data of interest X2 by the previously set multiplier coefficient.

The adder 205 adds up the results of multiplication by the multipliers 202 to 204, and outputs low-pass filter processed pixel data X2' with respect to the pixel data of interest X2 from a terminal 206.

As described above, as pixel data is inputted into the input terminal 200 in order of raster scanning, a frame represented with the pixel data as a result of addition by the adder 204 is a low frequency sub frame. The low frequency sub frame is temporarily stored into the frame memory 105 (see FIG. 1).

Briefly, by setting of the threshold Th, when the pixel data of interest X2 is not positioned in a dark area 1-pixel adjacent to a white character edge, the pixel data of interest X2 is subjected to filter processing using the normal low-pass filter multiplier coefficient V0 (hereinbelow, referred to as a "normal case").

On the other hand, when the pixel data of interest X2 is positioned in a dark area 1-pixel adjacent to a white character edge, the pixel data of interest X2 is subjected to the filter processing using the multiplier coefficient V1 less than the normal low-pass filter multiplier coefficient V0. In this case, increment in the value of the pixel data of interest X2 (brightness) can be suppressed in comparison with the above-described normal case.

Next, high-frequency sub frame generation processing will be described.

As shown in FIG. 1, the subtracter 103 subtracts the above-described low frequency sub frame generated by the LPF processor 102 from an input frame, thereby generating high frequency component data, in other words, a high frequency differential frame. That is, the subtracter 103 functions as a high-frequency differential frame generator. The adder 104 adds the high-frequency differential frame to the input frame from the input terminal 101, thereby generating a high frequency sub frame including high frequency components, and outputs the high frequency sub frame to the selection circuit 106. That is, the subtracter 103 and the adder 104 function as a high-frequency sub frame generator.

The selection circuit 106 alternately outputs the high frequency sub frame and low frequency sub frame supplied as the subjects of selection at a doubled rate of a frame frequency of an input moving image, i.e., by $1/120$ sec. As an output destination, a hold type display device is connected.

Next, the above-described processing will be described based on waveforms in FIGS. 2A to 2E.

Figure 2A:
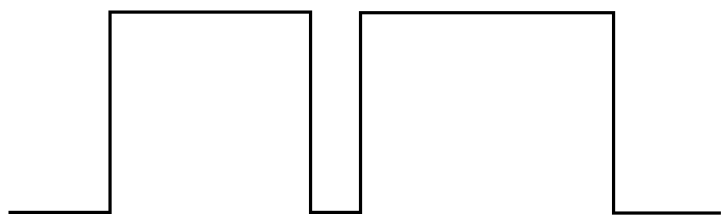
FIGS. 2A to 2E show waveforms in respective processing stages according to the first embodiment.
Figure 2B:
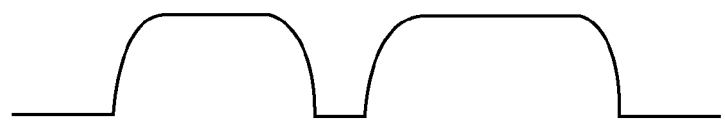

FIG. 2A shows a waveform of a line in a frame inputted from the input terminal 101. FIG. 2B shows a waveform in a low frequency sub frame after filter processing by the LPF processor 102 in the first embodiment. Note that as shown in the figures, the width of a high-brightness portion in the filter-processed low frequency sub frame is approximately equal to the width of a high-brightness portion in the input frame.

Figure 2C:
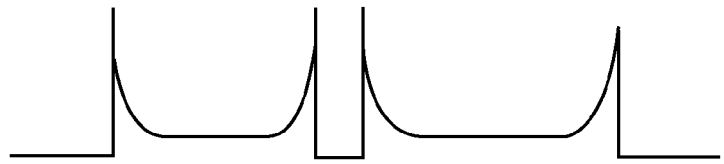

FIG. 2C shows a waveform obtained by subtracting the waveform in FIG. 2B from the waveform in FIG. 2A, i.e., a differential frame outputted from the subtracter 103. Further, FIG. 2D shows a waveform of a high frequency sub frame obtained by addition processing by the adder 104.

Figure 2D:
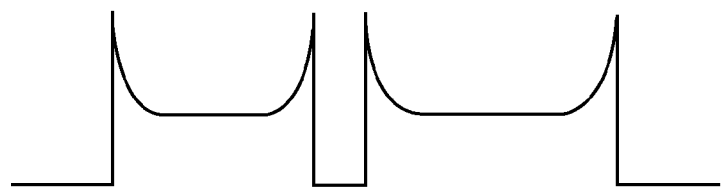
Figure 2E:
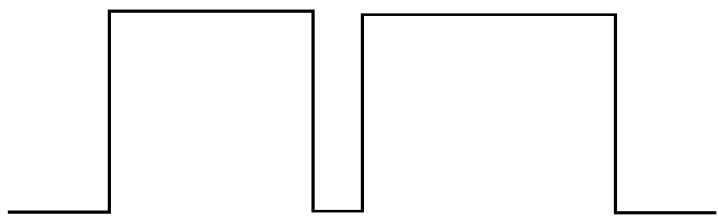

For example, when a frame rate of an input moving image is 60 frames/sec (60 Hz), the selection circuit 106 alternately outputs the 2 sub frames shown in FIGS. 2B and 2D in a cycle of $1/120$ sec (120 Hz). Accordingly, when a hold type display device is connected to the selection circuit 106, as 2 sub frames are displayed at a high speed, a video image of a waveform as shown in FIG. 2E is perceived by the human eye. That is, it is possible to cause a viewer to perceive the display as the same waveform as that in an input frame in FIG. 2A in 60 Hz display.

Note that the above description is made as an example using a monochrome image, however, the present invention is also applicable to a color image. In the case of a color display device, processing is often performed on 3 separated color components such as R, G and B, or Y, Cb and Cr. Accordingly, in the case of R, G and B components, the above-described processing is performed on the brightness values of the respective color components. Further, in the case of Y, Cb and Cr components, it is sufficient to perform the above-described processing only on the brightness component Y in point of the human visual sensibility.

Figure 3:
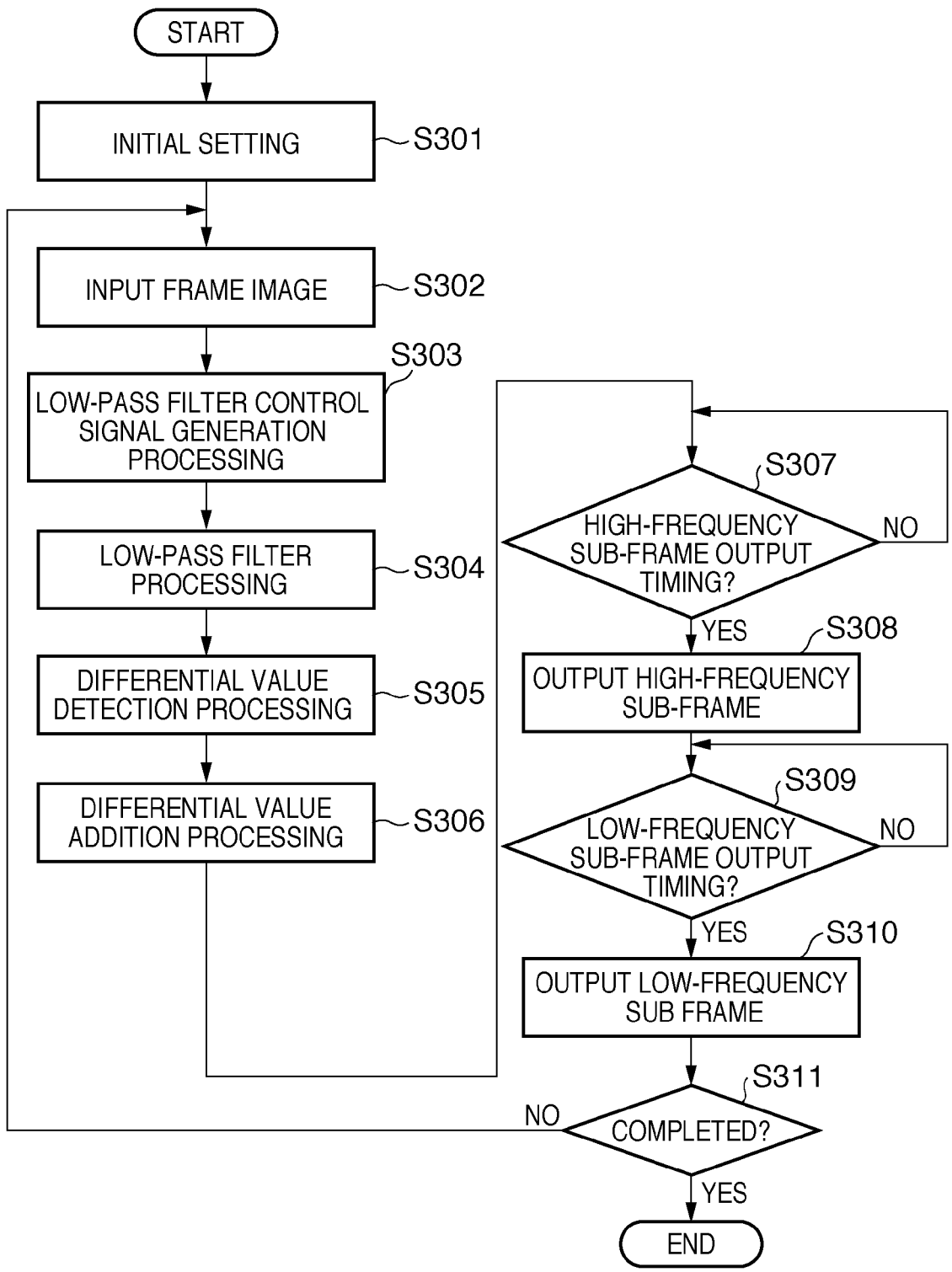
FIG. 3 is a flowchart showing the flow of processing in the first embodiment.

Next, the contents of the processing by the controller 500 in the image processing apparatus in the first embodiment will be described in accordance with the flowchart of FIG. 3.

First, in step S301, necessary initial settings are performed. At this step, the multiplier coefficients V0 and V1 and the threshold utilized by the LPF processor 102 are also set. In step S302, 1 frame image is inputted. The frame image corresponds to FIG. 2A. Next, in step S303, control signals are generated by processing circuits such as the differentiators 300 and 301 and the comparators 302 and 303 in the LPF processor 102, and thereby the multiplier coefficients used by the multipliers 202 and 204 are determined. Next, in step S304, the filter processing is performed by the multipliers 202 to 204 and the adder 205 in the LPF processor 102, and thereby the low frequency sub frame generation processing is performed. Thus, a low frequency sub frame having the waveform in FIG. 2B is generated.

Next, in step S305, the subtracter 103 subtracts the low frequency sub frame generated by the LPF processor 102 from the input frame, and thereby a high frequency differential frame is generated (see FIG. 2C). Then in step S306, the adder 104 adds the high frequency sub frame to the input frame, and thereby a high frequency sub frame is generated (see FIG. 2D).

In step S307, the selection circuit 106 determines an output timing of the high frequency sub frame, and in step S308, outputs the high frequency sub frame. After the output of the high frequency sub frame, the selection circuit 106 determines the output timing of the low frequency sub frame in step S309, and in step S310, outputs the low frequency sub frame. The processing in step S301 and the subsequent steps is repeated until it is determined in step S311 that there is no frame to be input. In the case of a hold type display device, a high frequency sub frame is displayed in $1/120$ sec, and a low frequency sub frame is displayed in the next $1/120$ sec. The apparent waveform in time average $1/60$ sec is as shown in FIG. 2E, the same as the input frame. Although it is possible to display a sub frame in a cycle shorter than $1/120$ sec by improving the response characteristic of liquid crystal and/or control of back light, the characteristic feature of the present invention that an apparent waveform the same as an input in a cycle of $1/60$ sec is generated, is not changed at all. Note that the output order of the low frequency sub frame and high frequency sub frame is not limited, but an output order opposite to the above order, e.g., may be used.

As described above, according to the first embodiment, in a case where an input moving image is converted to a moving image with a doubled frame rate, when the converted moving image is displayed on a hold type display device, blurring of edges of stationary subjects in the moving image can be suppressed.

[Second Embodiment]

Next, as a second embodiment, an example where the present invention is applied to an impulse type display device will be described.

Figure 4:
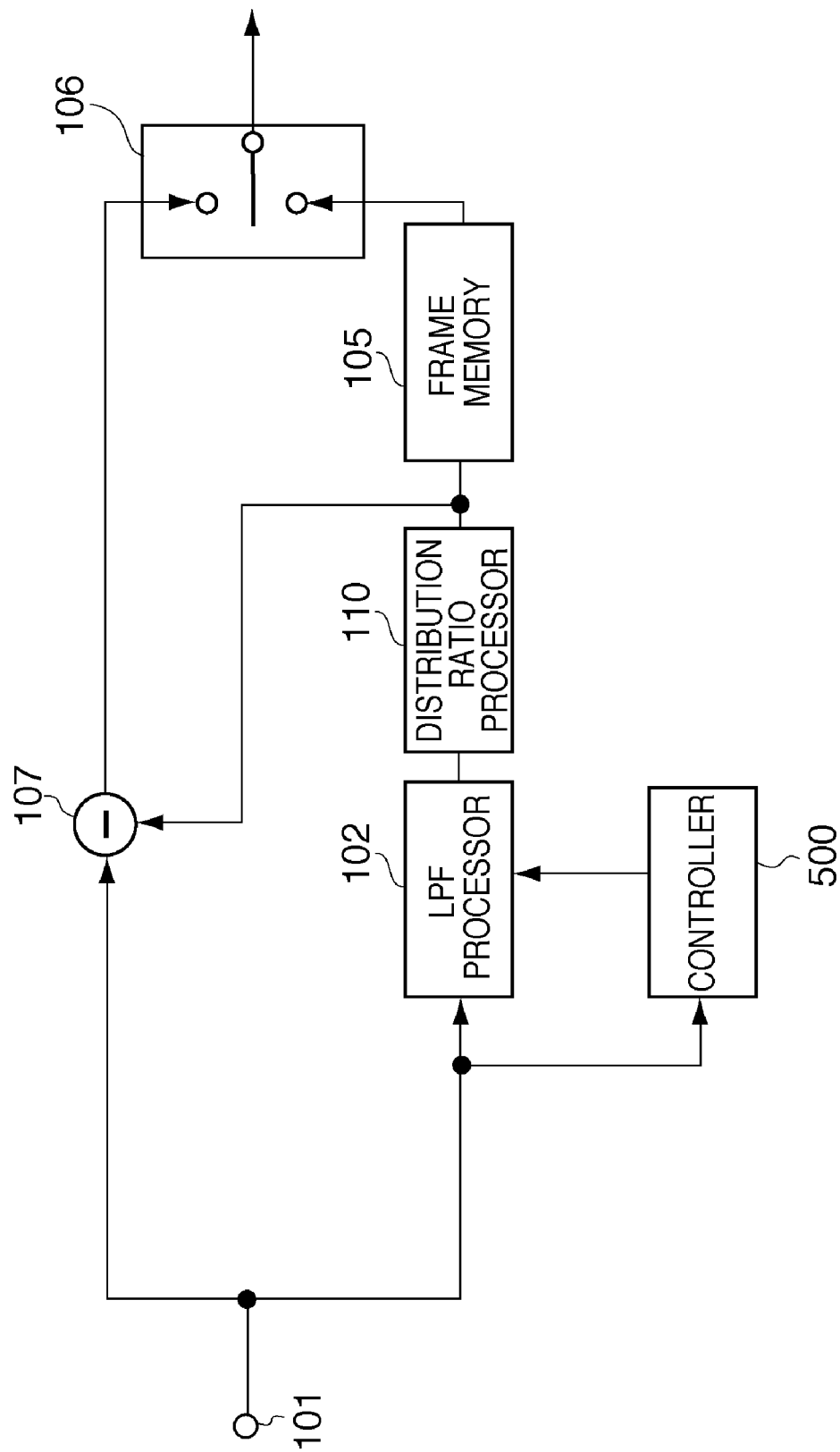
FIG. 4 is a block diagram showing the image processing apparatus according to a second embodiment of the present invention.

FIG. 4 is a block diagram showing the image processing apparatus according to the second embodiment. In FIG. 4, constituent elements having the same functions as those in FIG. 1 have the same reference numerals. Further, in FIG. 4, the difference from FIG. 1 is that a distribution ratio processor 110 is added and a subtracter 107 is added in place of the subtracter 103 and the adder 104.

As the LPF processor 102 is the same as that in the first embodiment, the content of the processing is as described in the first embodiment. Note that in the second embodiment, a low frequency sub frame from the LPF processor 102 is not a final sub frame. That is, the result of multiplication by a previously-set distribution ratio multiplier factor by the distribution ratio processor 110 becomes the final sub frame.

When moving image data is outputted at a frame rate double that of a normal frame rate to the impulse type display device, the original 1 frame is reproduced with 2 sub frames. Accordingly, it is necessary to distribute the brightness between the 2 sub frames. The distribution ratio processor 110 multiplies the low frequency sub frame from the LPF processor 102 by a multiplier coefficient "0.5", and stores the result of multiplication into the frame memory 105. The sub frame stored in the frame memory 105 becomes the final low frequency sub frame.

Figure 5A:
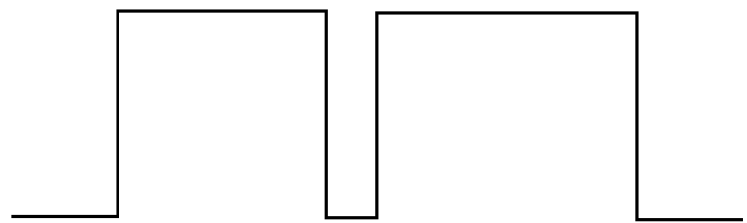
FIGS. 5A to 5E show waveforms in respective processing stages according to the second embodiment.
Figure 5B:
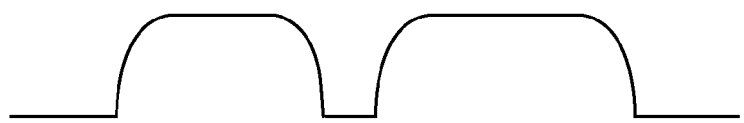

FIG. 5A shows a waveform of image data of a line in an input frame. FIG. 5B shows a result of processing by the LPF processor 102. The reason for this waveform is as described in the first embodiment. The distribution ratio processor 110 multiplies the waveform in FIG. 5B by the multiplier coefficient "0.5", and thereby generates a low frequency sub frame with ½ brightness, and stores the sub frame into the frame memory 105.

Next, the generation of a sub frame including high frequency components (high frequency sub frame) in the second embodiment will be described.

The subtracter 107 subtracts the low frequency sub frame generated by the distribution ratio processor 110 from the input frame. More particularly, the subtracter 107 performs processing to subtract a waveform in FIG. 5C from the waveform in FIG. 5A. The result of subtraction is a waveform in FIG. 5D, i.e., a high frequency sub frame.

Figure 5C:
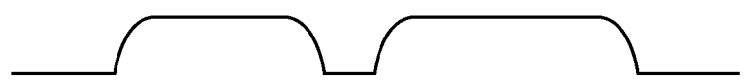

The selection circuit 106 alternately displays the 2 sub frames at desired timing, e.g., when the frequency of an input moving image is 60 Hz, in a cycle of 120 Hz. When the high frequency sub frame in FIG. 5D and the low frequency sub frame in FIG. 5C are alternately displayed, the produced display is viewed by the human eye as a waveform shown in FIG. 5E, and is perceived as the same waveform as that in the input frame in FIG. 5A in the 60 Hz display.

In this manner, the generation of sub frame in the hold type display device and that in the impulse type display device are different, however, common processing in the present invention in both types of display devices is that when a sub frame including only low frequency components is subtracted from an input frame, no negative value occurs.

Figure 6:
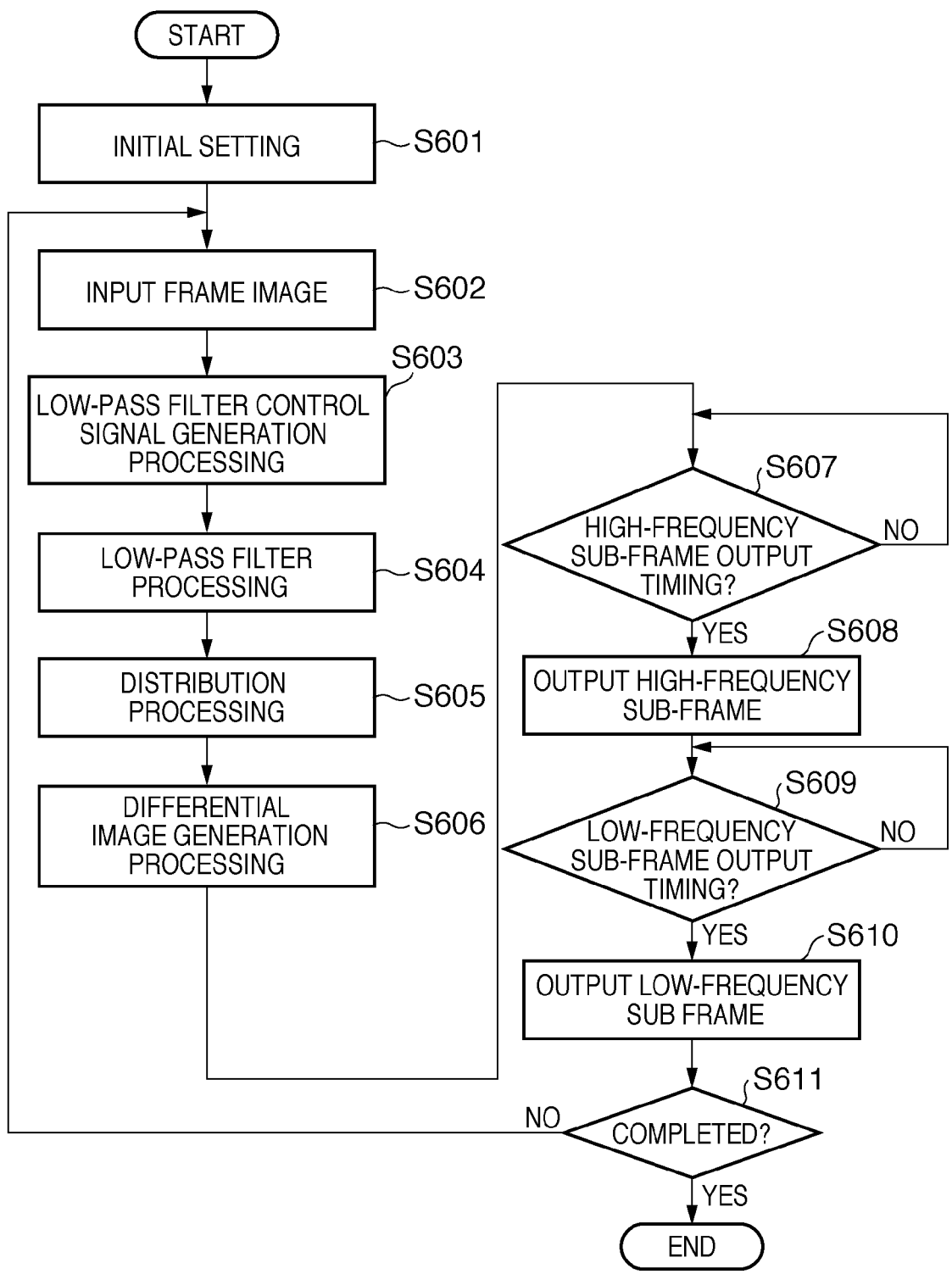
FIG. 6 is a flowchart showing the flow of processing in a third embodiment of the present invention.

Next, the content of the processing by the controller 500 in the second embodiment will be described in accordance with the flowchart of FIG. 6.

First, in step S601, necessary initial settings are performed. In this step, the multiplier coefficients V0 and V1 and the threshold Th set in the LPF processor 102 are determined. Note that when the number of filter taps can be set, it is also determined.

In step S602, 1 frame image is inputted. The frame image corresponds to FIG. 5A. Next, in step S603, control signals to set the previously determined multiplier coefficients and the threshold are generated. Next, in step S604, the filter processing is performed by the LPF processor 102. The waveform shown in FIG. 5B is the result of low-pass filter processing on the waveform shown in FIG. 5A.

Next, in step S605, distribution ratio processing by the distribution ratio processor 110 is performed. This processing is also processing to determine the percentage of a low frequency sub frame with respect to the entire frame. In this embodiment, the percentage is always 50% regardless of pixel values. The waveform shown in FIG. 5C is obtained by multiplying the waveform in FIG. 5B by 0.5 to reduce the brightness to 2/1 (i.e., by half). The waveform in FIG. 5C is a final low frequency sub frame.

Figure 5D:
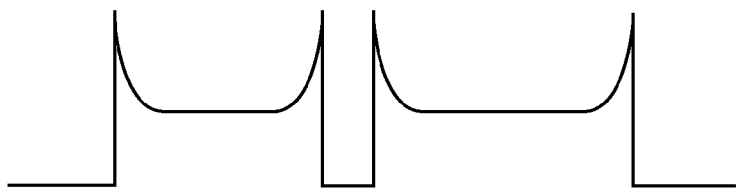

Next, in step S606, a high frequency sub frame as the other sub frame is generated. For this purpose, the subtracter 107 performs processing to subtract the low frequency sub frame generated by the distribution ratio processor 110 from the input frame. The waveform in FIG. 5D is the result of the subtraction. This waveform is a high frequency sub frame. As a characteristic feature of the present invention, the differential waveform has no negative value.

Figure 5E:
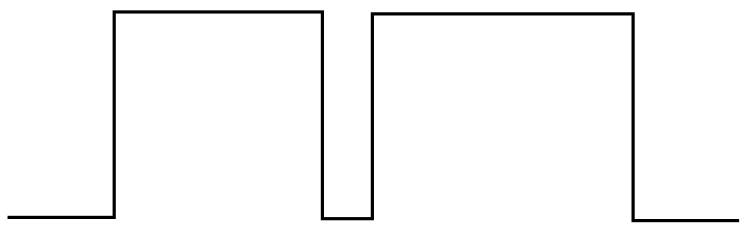

Next, in step S607, the selection circuit 106 determines output timing of the high frequency sub frame, and in step S608, outputs the high frequency sub frame. After the output of the high frequency sub frame, the selection circuit 106 determines output timing of the low frequency sub frame in step S609, and in step S610, outputs the low frequency sub frame. The processing in step S602 and the subsequent steps is repeated until it is determined in step S611 that there is no frame to be input. The respective sub frames can be displayed in any order. In the case of the impulse type display device, one sub frame is displayed in the first 1/120 sec, and the other sub frame is displayed in the next 1/120 sec. The apparent waveform in time average 1/60 sec is as shown in FIG. 5E, the same as the input frame (FIG. 5A).

As described above, according to the second embodiment, even when the present invention is applied to an impulse type display device, the same advantage as that in the first embodiment can be obtained.

[Third Embodiment]

Figure 8:
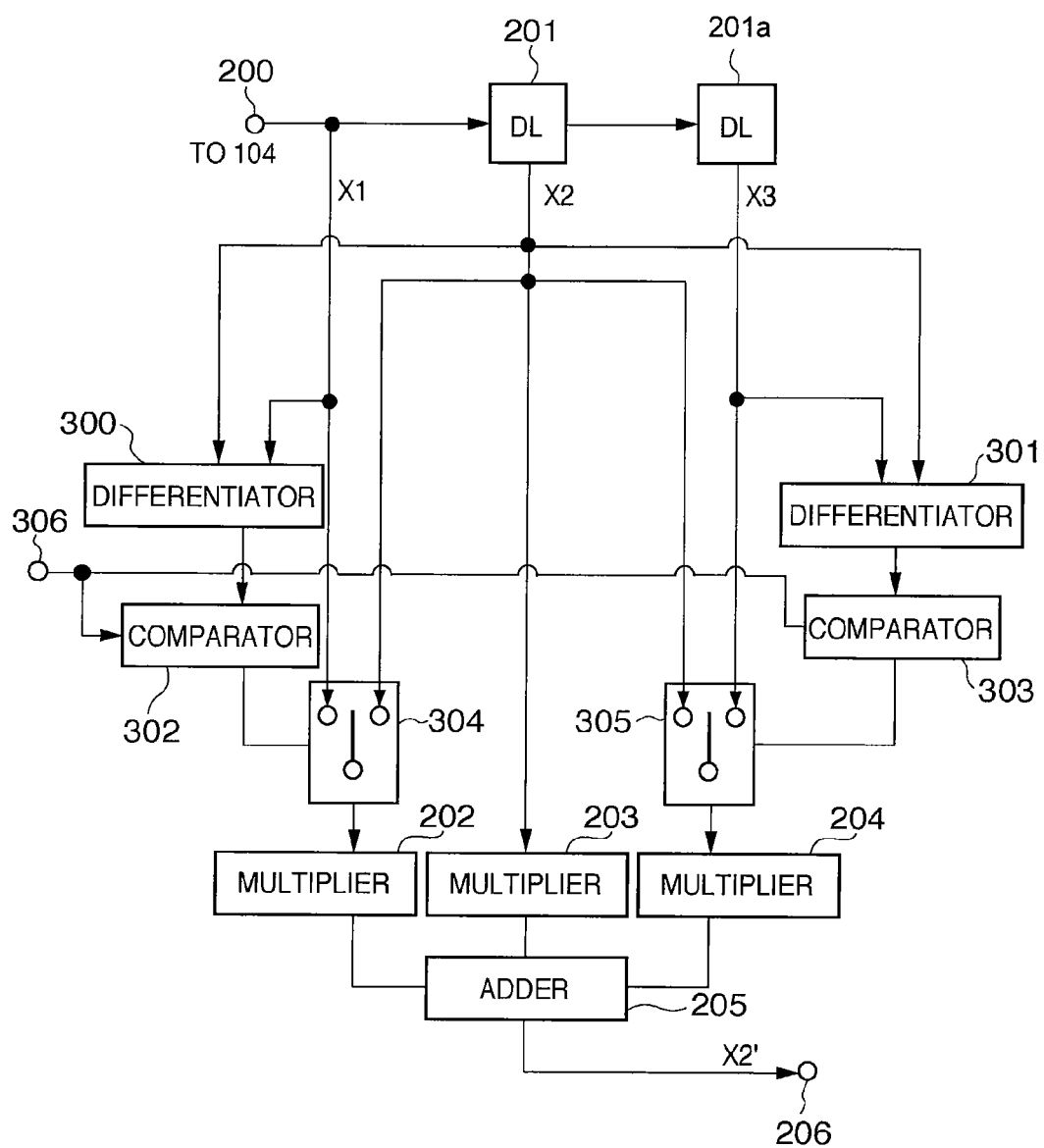
FIG. 8 is a block diagram of the low-pass filter processor in the third embodiment.

FIG. 8 shows another configuration of the LPF processor 102 in the first and second embodiments.

The difference between FIGS. 8 and 7 is wiring. Hereinbelow, the configuration in FIG. 8 will be described.

The differentiators 300 and 301 and the comparators 302 and 305 are the same as those in FIG. 7.

When a signal from the comparator 302 is "1", i.e., when the value of the pixel data of interest X2 is less than that of the neighbor pixel data X1, the selection circuit 304 selects the pixel data of interest X2 and outputs the selected data to the multiplier 202. Further, when the signal from the comparator 302 is "0", i.e., when the value of the pixel data of interest X2 is equal to or greater than that of the neighbor pixel data X1, the selection circuit 304 selects the neighbor pixel data X1 and outputs the selected data to the multiplier 202.

On the other hand, when a signal from the comparator 303 is "1", i.e., when the value of the pixel data of interest X2 is less than that of the neighbor pixel data X3, the selection circuit 305 selects the pixel data of interest X2 and outputs the selected data to the multiplier 204. Further, when the signal from the comparator 303 is "0", i.e., when the value of the pixel data of interest X2 is equal to or greater than that of the neighbor pixel data X3, the selection circuit 305 selects the neighbor pixel data X3 and outputs the selected data to the multiplier 204.

The multipliers 202 to 204 respectively multiply the value of input pixel data by a previously-set fixed multiplier coefficient (equal to or greater than 0 and less than 1). The adder 205 inputs the results of multiplication by the respective multipliers, adds them up, and outputs the result of addition as pixel data X2' after low-pass filter processing of the pixel data of interest X2.

According to the above configuration, as in the case of that in FIG. 7, when the pixel data of interest X2 is positioned in a dark area adjacent to a white character edge by 1 pixel, increment in the value (brightness) of the pixel data of interest X2 can be suppressed. Accordingly, when this configuration is applied to the first and second embodiments, blurring of edges of stationary subjects in a moving image can be improved.

Note that the differentiators 300 and 301 in the configuration in FIG. 8 calculate the differences d1 and d2; however, the differentiators 300 and 301 may calculate the absolute values of the differences d1 and d2.

[Fourth Embodiment]

As a fourth embodiment, an example where the above-described first to third embodiments are implemented with a computer program read and executed by a computer will be described.

Figure 9:
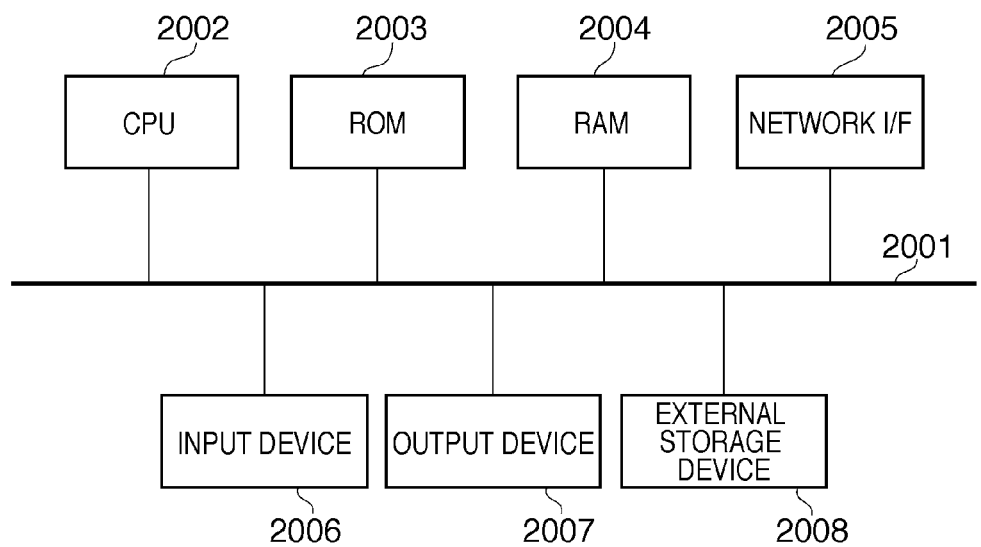
FIG. 9 is a block diagram showing an example of hardware configuration of a computer in a fourth embodiment of the present invention.
Figure 10:
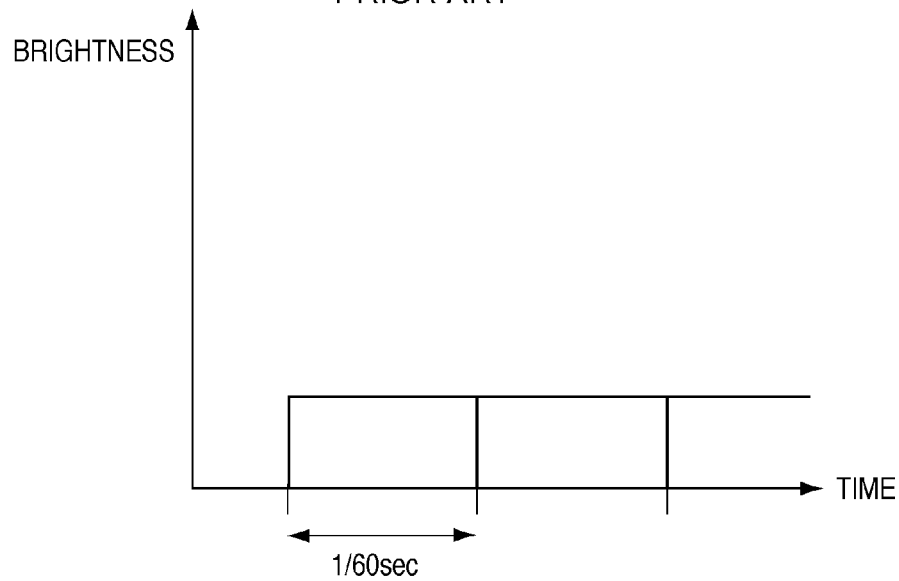
FIG. 10 is a graph showing light emission time of a hold type display device.
Figure 11:
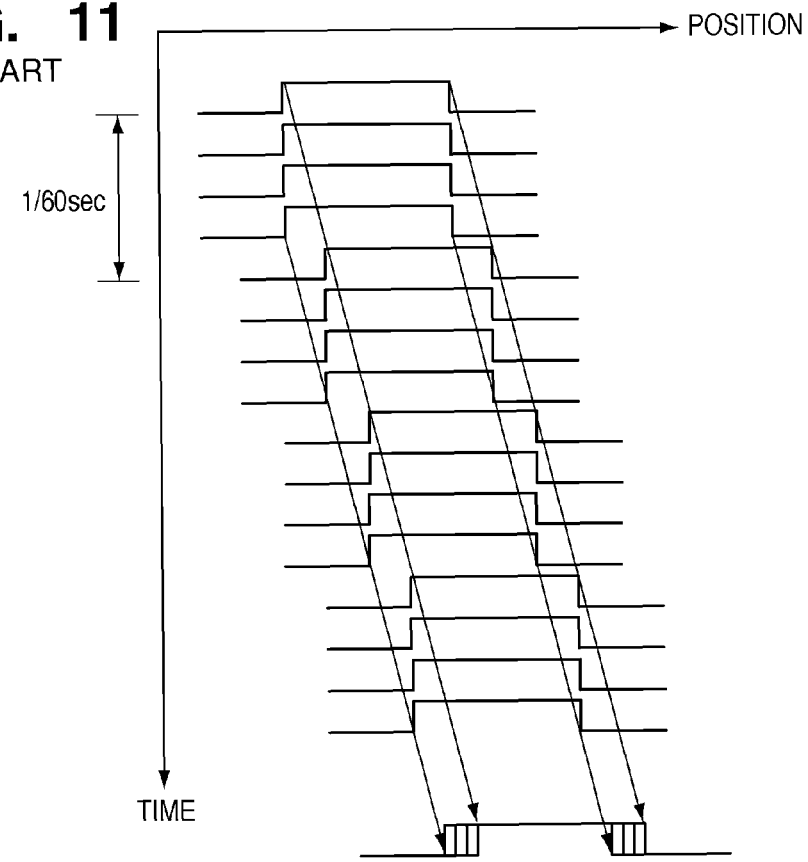
FIG. 11 is a graph showing a dynamic characteristic of the hold type display device.
Figure 12:
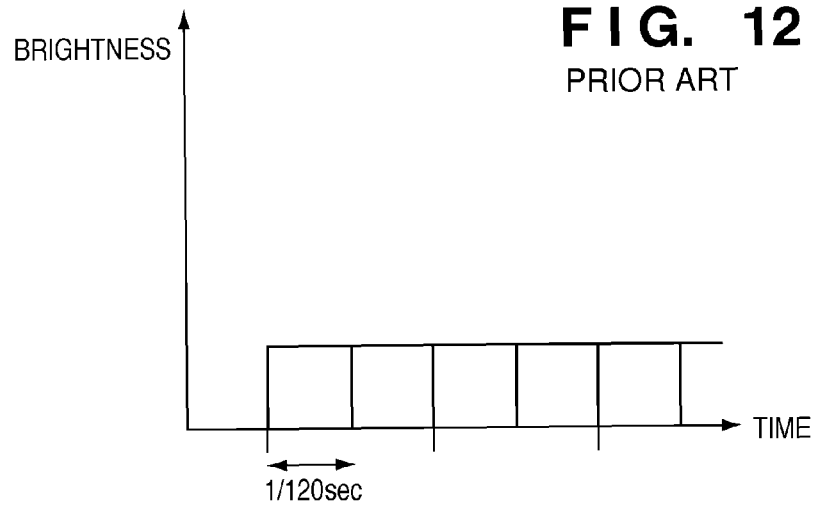
FIG. 12 is a graph showing light emission time in doubled-speed driving in the hold type display device.
Figure 13:
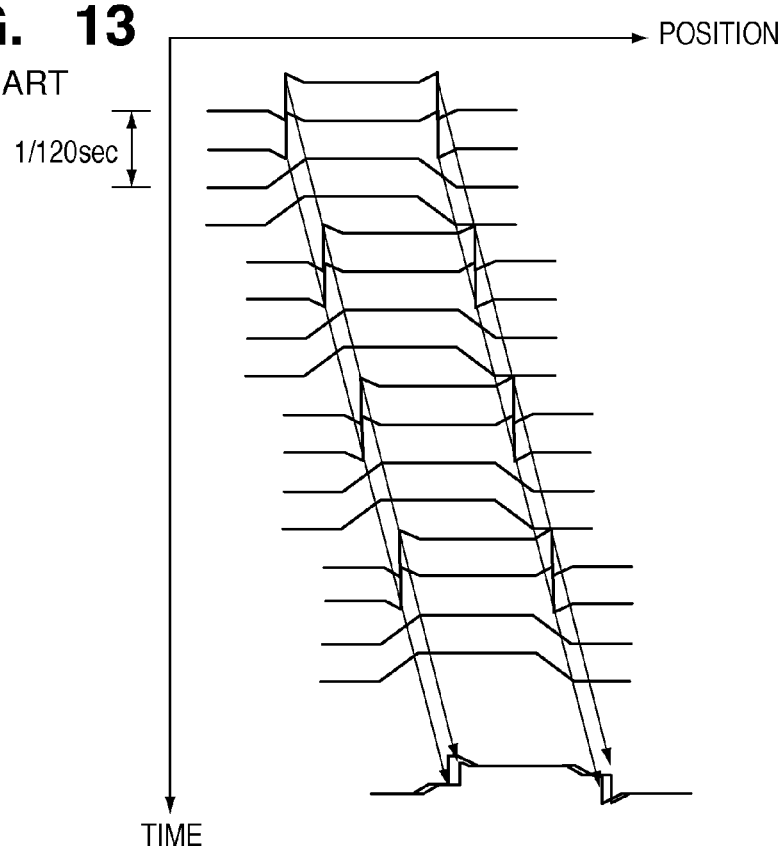
FIG. 13 is a graph showing the dynamic characteristic of the hold type display device in the doubled-speed driving.
Figure 14:
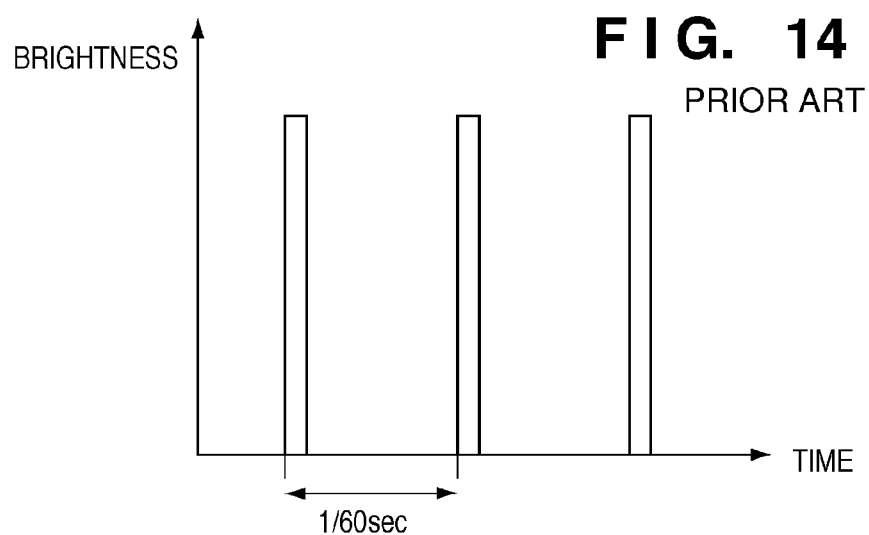
FIG. 14 is a graph showing the light emission time in an impulse type display device.
Figure 15:
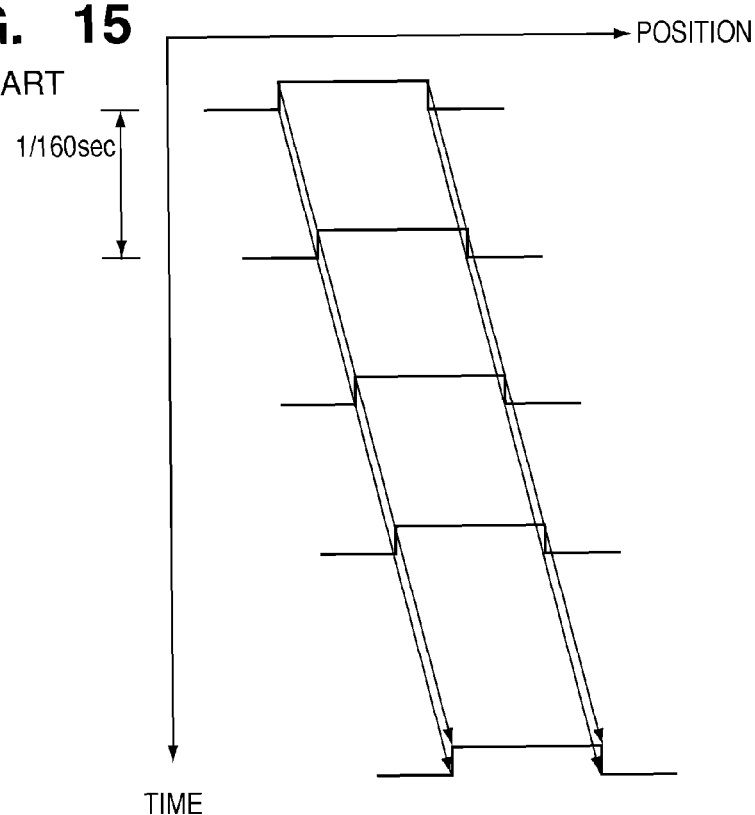
FIG. 15 is a graph showing the dynamic characteristic of the impulse type display device.
Figure 16:
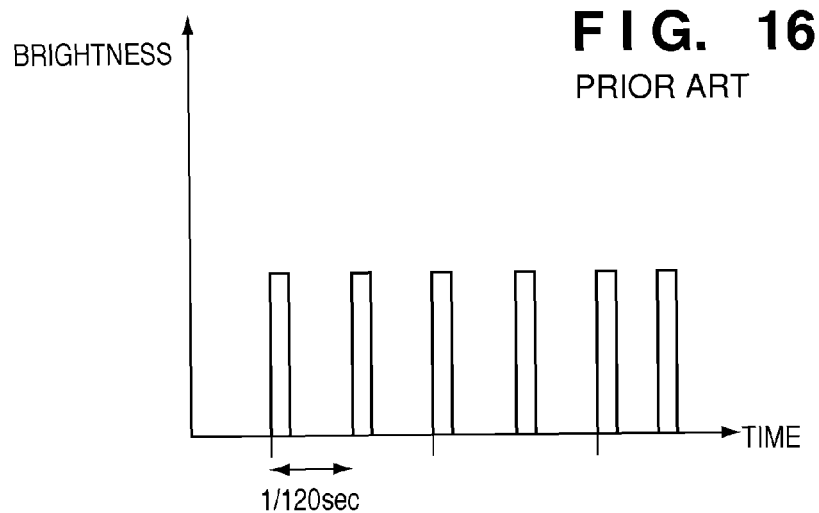
FIG. 16 is a graph showing the light emission time in the impulse type display device in the doubled-speed driving.
Figure 17:
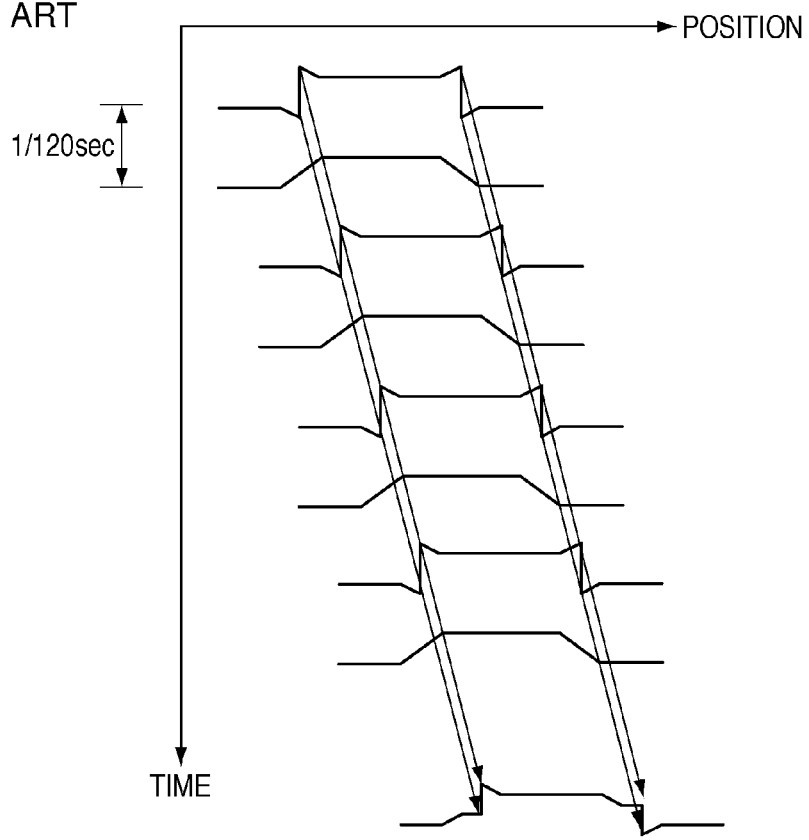
FIG. 17 is a graph showing the dynamic characteristic in the impulse type display device in the doubled-speed driving.
Figure 18:
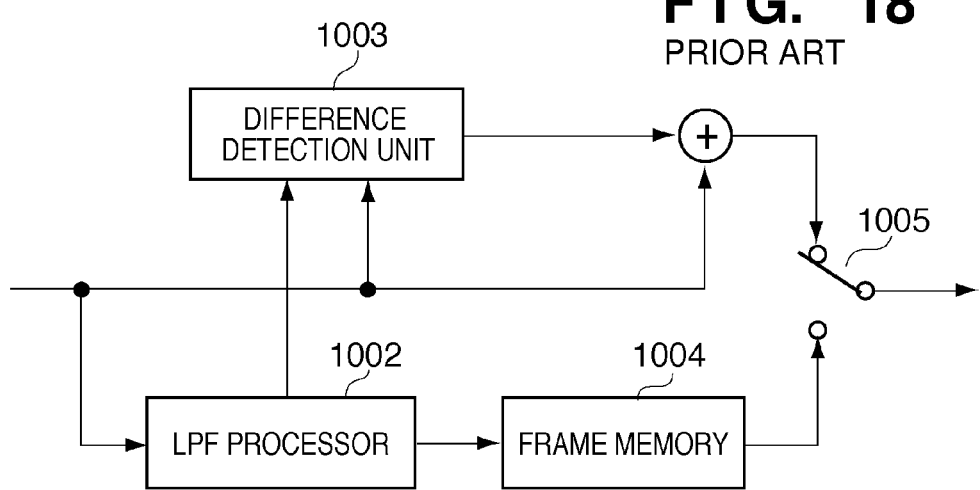
FIG. 18 is a block diagram showing a conventional circuitry.
Figure 19A:
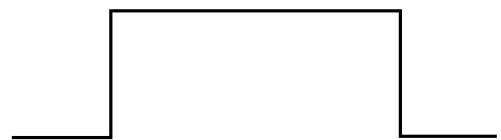
FIGS. 19A to 19F show waveforms processed by a conventional method.
Figure 19B:
Figure 19C:
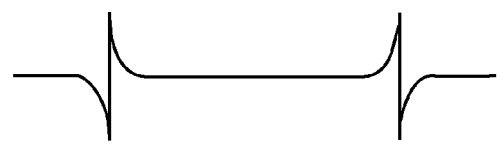
Figure 19D:
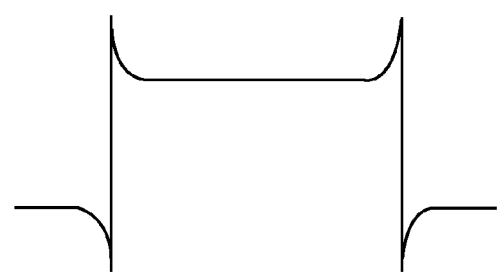
Figure 19E:
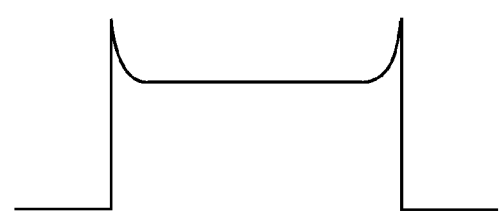
Figure 19F:
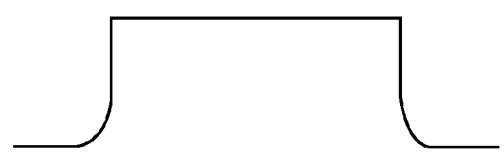

FIG. 9 is a block diagram of a general computer (personal computer). As shown in FIG. 9, the computer has a CPU 2002 to control the entire apparatus, a ROM 2003 holding a BIOS and a boot program, and a RAM 2004 used as a work area for the CPU 2002 and for loading an application program to be executed. Further, the computer has a network interface 2005, an input device 2006 including a keyboard, a mouse and the like, an output device 2007 such as a display device, and an external storage device 2008 such as a hard disk. These constituent elements are interconnected via a system bus 2001.

When the power of the present apparatus is turned ON, the CPU 2002 loads the OS (Operating System) in the external storage device 2008 to the RAM 2004 in accordance with the boot program stored in the ROM 2003 and starts the OS. As a result, the present apparatus functions as an information processing apparatus. Thereafter, when the user operates the input device 2006 to give an instruction to start an application for moving image conversion, the CPU 2002 loads a corresponding application for moving image conversion from the external storage device 2008 to the RAM 2004 and executes the application. As a result, the present apparatus functions as an image processing apparatus.

When the present apparatus functions as an image processing apparatus, the CPU 2002 inputs, e.g., a moving image data file (designated by the user) as a subject of conversion, stored in the external storage device 2008, by one frame. Then the CPU 2002 generates a low frequency sub frame and high frequency sub frame by similar processing to that in the first to third embodiments and stores them as a moving image file onto a hard disk or the like. Note that it may be arranged such that for doubled-speed driving, the moving image is not stored as a file but is outputted to a display device.

Particularly, when a moving image converted for doubled-speed driving is stored as a file, real-time reproduction is not necessary. Accordingly, in this case, a doubled-speed moving image file is generated at a rate depending on the throughput of the CPU 2002. Accordingly, when the result of processing for doubled-speed driving is stored as a file, the timing control at steps S307 and S309 in FIG. 3 or steps S607 and S609 in FIG. 6 can be omitted.

As described above, it is possible for a computer to perform similar processing to that in the first to third embodiments according to a computer program.

Further, generally, a computer program is stored on a computer-readable storage medium such as a CPU-ROM or a memory card. When the computer-readable storage medium is set in a reading device (CD-ROM drive or memory card reader) of a computer and the program is copied or installed in the system, the program becomes executable. Accordingly, such computer-readable storage medium holding the computer program is included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-189047, filed Jul. 22, 2008, which is hereby incorporated by reference herein in its entirety.

What is claimed is:

1. An image processing apparatus for converting moving image data having F frames per unit time into moving image data having 2F sub frames per the unit time, the apparatus comprising:

an input unit to input moving image data by frame;

a low-pass filter to multiply pixel data of interest and neighbor pixel data of the pixel data of interest in the frame inputted by said input unit by a multiplier coefficient and to add up the results of multiplication, thereby generating a low-frequency sub frame;

a high-frequency sub frame generator to extract high frequency component data from the frame inputted by said input unit and to add the high frequency component data to the frame inputted by said input unit, thereby generating a high-frequency sub frame; and an output unit to output the low-frequency sub frame and the high-frequency sub frame, wherein said low-pass filter comprises:

(a) a subtracter to subtract a brightness value of the pixel data of interest from a brightness value of the neighbor pixel data;

(b) a comparator to compare a result d1 of subtraction by said subtracter with a previously-set threshold Th equal to or greater than 0; and (c) a selector to, (1) when $d1 \leq Th$ holds as the result of comparison by said comparator, select a previously-set positive multiplier coefficient V0 as a multiplier coefficient for multiplication of the neighbor pixel data, and (2) while when $d1 > Th$ holds as the result of comparison by said comparator, select a positive multiplier coefficient V1 less than the multiplier coefficient V0 as the multiplier coefficient for multiplication of the neighbor pixel data, wherein the apparatus further comprises a multiplier to multiply the low-frequency sub frame generated by said low-pass filter by a positive multiplier coefficient less than 1, and to output the result of multiplication as a subject of selection by said output unit, and wherein said high-frequency sub frame generator subtracts the result of multiplication by said multiplier from the frame inputted by said input unit, thereby generating the high-frequency sub frame.

2. An image processing apparatus for converting moving image data having F frames per unit time into moving image data having 2F sub frames per the unit time, the apparatus comprising:

an input unit to input moving image data by frame;

a low-pass filter to multiply pixel data of interest and neighbor pixel data of the pixel data of interest in the frame inputted by said input unit by a multiplier coefficient and to add up the result of multiplication, thereby generating a low-frequency sub frame;

a high-frequency sub frame generator to extract high frequency component data from the frame inputted by said input unit and to add the high frequency component data to the frame inputted by said input unit, thereby generating a high-frequency sub frame; and an output unit to output the low-frequency sub frame and the high-frequency sub frame, wherein said low-pass filter comprises:

(a) a subtracter to subtract a brightness value of the pixel data of interest from a brightness value of the neighbor pixel data;

(b) a comparator to compare a result d1 of subtraction by said subtracter with a previously-set threshold Th equal to or greater than 0; and (c) a processor to, (1) when d1≦Th holds as the result of comparison by said comparator, perform low-pass filter processing on the pixel data of interest using the pixel data of interest and the neighbor pixel data, and (2) while when d1>Th holds as the result of comparison by said comparator, performing the low-pass filter processing on the pixel data of interest using the pixel data of interest and the pixel data of interest as substitute data for the neighbor pixel data, wherein the apparatus further comprises a multiplier to multiply the low-frequency sub frame generated by said low-pass filter by a positive multiplier coefficient less than 1, and to output the result of multiplication as a subject of selection by said output unit, and wherein said high-frequency sub frame generator subtracts the result of multiplication by said multiplier from the frame inputted by said input unit, thereby generating the high-frequency sub frame.

3. A control method for an image processing apparatus for converting moving image data having F frames per unit time into moving image data having 2F sub frames per the unit time, the method comprising:

an input step of inputting moving image data by frame;

a low-pass filter step of multiplying pixel data of interest and neighbor pixel data of the pixel data of interest in the frame inputted at said input step by a multiplier coefficient and adding up the results of multiplication, thereby generating a low-frequency sub frame;

a high-frequency sub frame generation step of extracting high frequency component data from the frame inputted at said input step and adding the high frequency component data to the frame inputted at said input step, thereby generating a high-frequency sub frame; and an output step of outputting the low-frequency sub frame and the high-frequency sub frame, wherein said low-pass filter step comprises:

(a) a subtraction step of subtracting a brightness value of the pixel data of interest from a brightness value of the neighbor pixel data;

(b) a comparison step of comparing a result d1 of subtraction at said subtraction step with a previously-set threshold Th equal to or greater than 0; and (c) a selection step of, (1) when d1≦Th holds as the result of comparison at said comparison step, selecting a previously-set positive multiplier coefficient V0 as a multiplier coefficient for multiplication of the neighbor pixel data, and (2) while when d1>Th holds as the result of comparison at said comparison step, selecting a positive multiplier coefficient V1 less than the multiplier coefficient V0 as the multiplier coefficient for multiplication of the neighbor pixel data, wherein the method further comprises a multiplication step of multiplying the low-frequency sub frame generated by said low-pass filter step by a positive multiplier coefficient less than 1, and outputting the result of multiplication as a subject of selection by said output step, and wherein said high-frequency sub frame generation step subtracts the result of multiplication by said multiplication step from the frame inputted by said input step, thereby generating the high-frequency sub frame.

4. A control method for an image processing apparatus for converting moving image data having F frames per unit time into moving image data having 2F sub frames per the unit time, the method comprising:

an input step of inputting moving image data by frame;

a low-pass filter step of multiplying pixel data of interest and neighbor pixel data of the pixel data of interest in the frame inputted at said input step by a multiplier coefficient and adding up the results of multiplication, thereby generating a low-frequency sub frame;

a high-frequency sub frame generation step of extracting high frequency component data from the frame inputted at said input step and adding the high frequency component data to the frame inputted at said input step, thereby generating a high-frequency sub frame; and an output step of outputting the low-frequency sub frame and the high-frequency sub frame, wherein said low-pass filter step comprises:

(a) a subtraction step of subtracting a brightness value of the pixel data of interest from a brightness value of the neighbor pixel data;

(b) a comparison step of comparing a result d1 of subtraction at said subtraction step with a previously-set threshold Th equal to or greater than 0; and (c) processing step of, (1) when d1≦Th holds as the result of comparison at said comparison step, performing low-pass filter processing on the pixel data of interest using the pixel data of interest and the neighbor pixel data, and (2) while when d1>Th holds as the result of comparison at said comparison step, performing the low-pass filter processing on the pixel data of interest using the pixel data of interest and the pixel data of interest as substitute data for the neighbor pixel data, wherein the method further comprises a multiplication step of multiplying the low-frequency sub frame generated by said low-pass filter step by a positive multiplier coefficient less than 1, and outputting the result of multiplication as a subject of selection by said output step, wherein said high-frequency sub frame generation step subtracts the result of multiplication by said multiplication step from the frame inputted by said input step, thereby generating the high-frequency sub frame.

5. A non-transitory computer-readable storage medium holding a computer program read and executed by a computer, thereby causing the computer to function as the image processing apparatus recited in claim 1.

6. A non-transitory computer-readable storage medium holding a computer program read and executed by a computer, thereby causing the computer to function as the image processing apparatus recited in claim 2.

* * * * *